US008677258B2

(12) United States Patent
Gadeib

(10) Patent No.: US 8,677,258 B2
(45) Date of Patent: Mar. 18, 2014

(54) METHOD OF AND APPARATUS FOR ASCERTAINING AND PROVIDING INFORMATION IN RELATION TO AN IMAGE

(75) Inventor: Andera Gadeib, Aachen (DE)

(73) Assignee: SmartMunk GmbH (DE)

(*) Notice: Subject to any disclaimer, the term of this patent is extended or adjusted under 35 U.S.C. 154(b) by 1083 days.

(21) Appl. No.: 12/106,259

(22) Filed: Apr. 18, 2008

(65) Prior Publication Data
US 2008/0263466 A1    Oct. 23, 2008

(30) Foreign Application Priority Data

Apr. 18, 2007 (DE) .................. 10 2007 018 562

(51) Int. Cl.
G06F 3/048 (2013.01)
(52) U.S. Cl.
USPC ........................... 715/764; 715/232; 715/765
(58) Field of Classification Search
USPC ......................................... 715/764, 232, 765
See application file for complete search history.

(56) References Cited

U.S. PATENT DOCUMENTS

| | | | |
|---|---|---|---|
| 6,356,274 B1 * | 3/2002 | Spector ......................... | 345/589 |
| 6,434,326 B1 * | 8/2002 | Kondo et al. ................. | 386/241 |
| 6,987,535 B1 * | 1/2006 | Matsugu et al. .............. | 348/239 |
| 8,144,991 B2 * | 3/2012 | Nagamatsu et al. .......... | 382/190 |
| 2003/0214532 A1 * | 11/2003 | Nakamura .................... | 345/764 |
| 2006/0072827 A1 * | 4/2006 | Nagamatsu et al. .......... | 382/190 |
| 2006/0242139 A1 * | 10/2006 | Butterfield et al. ............. | 707/5 |
| 2006/0242178 A1 * | 10/2006 | Butterfield et al. ........... | 707/100 |
| 2008/0109742 A1 * | 5/2008 | VanAnden .................... | 715/765 |
| 2010/0057555 A1 * | 3/2010 | Butterfield et al. ......... | 705/14.41 |

FOREIGN PATENT DOCUMENTS

WO    2006116196    11/2006

OTHER PUBLICATIONS

German Office Action dated Aug. 7, 2007 with English language translation issued in corresponding German Patent Application No. 10 2007 018 562.8, 13 pages.
German Office Action dated Jan. 7, 2008 with English language translation issued in corresponding German Patent Application No. 10 2007 018 562.8, 10 pages.

(Continued)

Primary Examiner — Stephen Hong
Assistant Examiner — Marshon Robinson
(74) Attorney, Agent, or Firm — Grossman Tucker Perreault & Pfleger PLLC

(57) ABSTRACT

The invention concerns a method of ascertaining and providing information in relation to an image in a survey comprising: displaying the image to a large number of survey persons; recording the input of metadata in relation to the image which are inputted by the large number of survey persons; and carrying out an assessment of the recorded metadata in relation to the image. The method according to the invention is distinguished in that the image is subdivided into pre- and/or postdetermined image portions ($150, 150^i, 150^{ii}, 150^{iii}, 150^{iv}, 150^v, 150^{vi}$), wherein the input of at least one metadatum is recorded in relation to a region (140) of the image that can be freely selected by a survey person and wherein the freely selected image region is compared to the predetermined or postdetermined image portions and upon the occurrence of a conformity beyond a predetermined degree the metadatum recorded in relation to the freely selected image region is associated with the conforming, predetermined or postdetermined image portion.
The invention further includes an apparatus for ascertaining and providing information in relation to an image in a survey.

17 Claims, 9 Drawing Sheets

(56) References Cited

OTHER PUBLICATIONS

Figure 1:
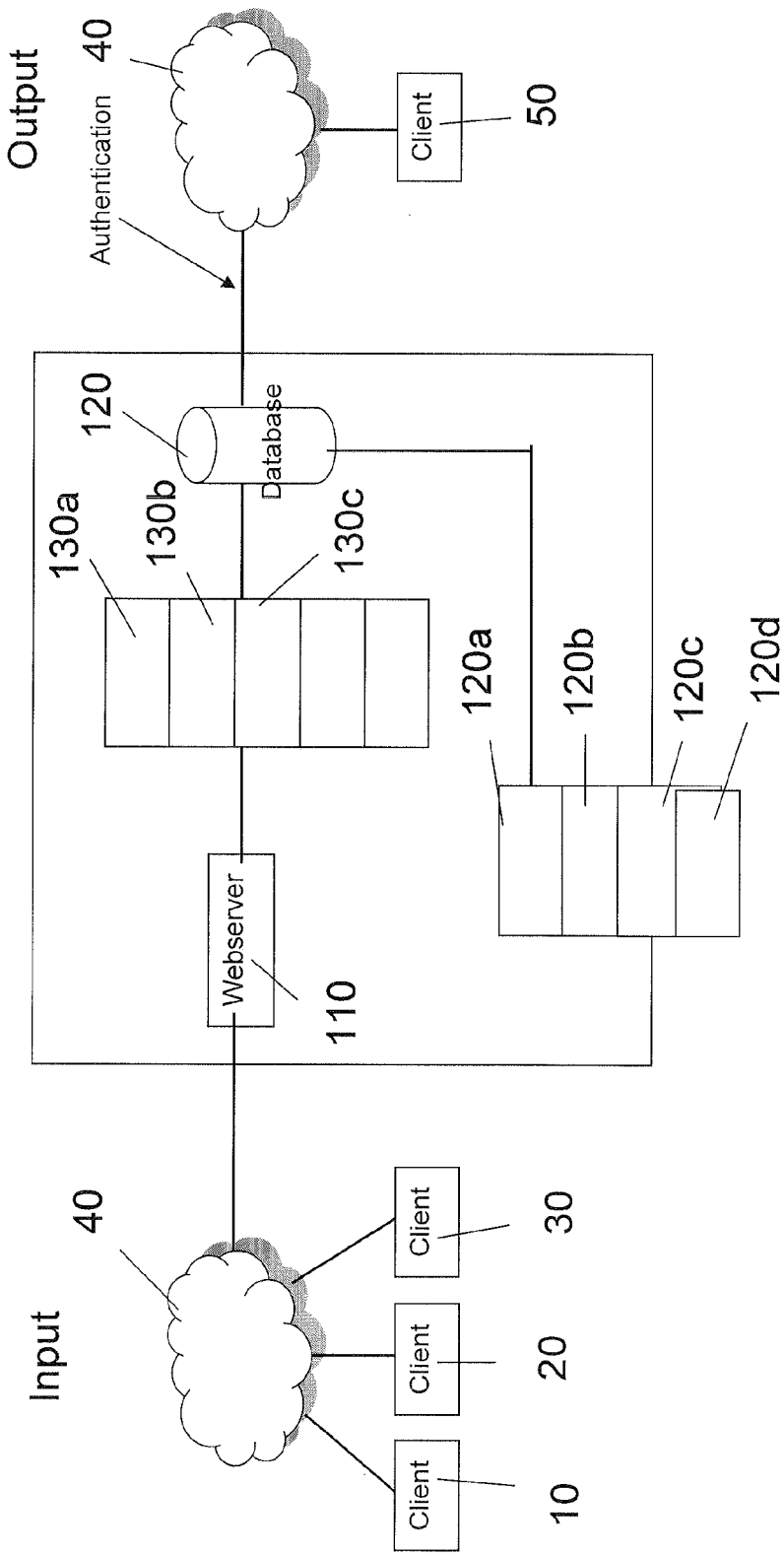

European Search Report dated Dec. 23, 2009 issued in corresponding European Patent Application No. 08103317.7, 5 pages.

Catherine E. Chronaki, et al., I2Cnet Medical Image Annotation Service, Medical Informatics, Special Issue, 1997, pp. 337-347, vol. 22(4).

* cited by examiner

METHOD OF AND APPARATUS FOR ASCERTAINING AND PROVIDING INFORMATION IN RELATION TO AN IMAGE

The invention concerns a method of and an apparatus for ascertaining and providing items of information in relation to an image in a survey in which the image is displayed to a large number of survey persons, inputs of metadata in relation to the image which are inputted by the large number of survey persons are recorded and an assessment of the recorded metadata in relation to the image is effected.

Particularly by way of the medium of the Internet it is possible to easily carry out surveys and consultations in which it is possible in a short time to reach a large number of survey persons who can express themselves on any themes. International laid-open application WO 2006/116196 A2 describes such a conventional method. In the known method, users can add any comments, keywords or tags, descriptions, classifications, annotations or additions etc, which are referred to hereinafter generally as metadata, to a media object such as an image. In accordance with the conventional method such detection of metadata which were added by a large number of survey persons to an image is generally restricted to the media object overall, for example the image. In certain situations however it could be desirable to record more detailed metadata in relation to the image and to process same, which is not possible with the conventional method.

In that respect the object of the invention is to provide a method and an apparatus with which it is possible to implement a more detailed survey about an image, wherein the surveyed metadata are subjected to data processing in such a way that they are accessible to statistical evaluation.

In a surprisingly simple fashion in accordance with the invention that object is attained by a method having the features of claim 1 and an apparatus having the features of claim 16.

In the method aspect the invention is distinguished in that the image is subdivided into pre- and/or postdetermined image portions, wherein the input of at least one metadatum is recorded in relation to a region of the image that can be freely selected by a survey person and wherein the freely selected image region is compared to the predetermined or postdetermined image portions and upon the occurrence of a conformity beyond a predetermined degree the metadatum recorded in relation to the freely selected image region is associated with the conforming, predetermined or postdetermined image portion.

The described measure according to the method provides on the one hand that the survey persons can input metadata not only in relation to the overall image but also in relation to given regions. In that respect the method according to the invention makes it possible for a survey person to select any image region and to input a metadatum in relation thereto so that the survey persons can select in relation to the selection of image regions completely independently of any presettings or defaults. By way of example the overall image, a part of the image or in the extreme case the smallest part of the image, that is to say a single pixel, can be selected. In that respect at least one metadatum is inputted and recorded by the system. In that respect the survey persons are not pre-influenced in relation to the image or image parts themselves but can select any regions in relation to which at least one metadatum is then inputted. The method according to the invention is excellently well suitable for surveys and polls for marketing or advertising purposes.

So that the inputs which can be of any desired nature in relation to the image region can be statistically evaluated, it is provided in accordance with the invention that the image region selected by the respective survey person is compared to predetermined or postdetermined image portions which represent regions of the overall image or the image overall. Those predetermined or postdetermined image portions, assembled together like individual mosaic tesserae, can represent the overall image, it may however also be the case that the image portions when assembled together represent only a portion of the image. In that respect division of the image into predetermined or postdetermined image portions does not have to be complete in every case, that is to say not in every case such that all predetermined or postdetermined image portions when assembled together afford the complete image.

In addition it can also be provided that predetermined or postdetermined image portions overlap, that is to say include identical image parts.

In that respect 'predetermined' signifies that the image portions are defined prior to the survey. 'Postdetermined' signifies that the image portions to which the respectively selected image regions are compared are defined after the beginning of the survey, that is to say during and/or after the conclusion of the survey.

For the sake of better understanding hereinafter the image parts selected by survey persons are referred to as image regions and the predetermined or postdetermined image parts are referred to as image portions.

If the comparison, in accordance with predetermined criteria, provides conformity, the metadatum recorded in relation to a selected image region is associated with the conforming image portion so that subsequently evaluation of the survey or poll can be effected in relation to predetermined or postdetermined image portions.

The depiction according to the invention of the freely selectable image regions with associated metadata on predetermined and/or postdetermined image portions, with which then the respective metadata are associated, first permits simple analysis of the surveyed data.

Advantageous embodiments are set forth in the appendant claims.

Preferably the freely selectable image regions or the predetermined and/or postdetermined image portions are interrelated, in particular in rectangular form, so that they can be inputted by means of a computer mouse in a simple fashion. In that respect it may be desirable if the totality of all image portions precisely affords the image, with the image portions not overlapping. In certain embodiments however it is also possible to provide such overlapping.

It may be desirable if the comparison of the freely selected image region with the predetermined and/or postdetermined image portions is carried out in relation to a conformity in respect of area. For example it is possible to establish that a conformity is present when the freely selected image region includes at least a predetermined percentage of an image portion. That amount can desirably be between 50% and 90%, particularly desirably between 60% and 70%.

It may be desirable if the items of information ascertained by the statistical assessment in relation to the image are represented visually.

In addition it is advantageous if the statistical assessment of the recorded metadata in relation to the image is carried out in relation to the metadata associated with the predetermined and/or postdetermined image portions. In that way the items of information inputted by the survey persons can be compared to predetermined data and for example hypotheses and assumptions in relation to the respective images can be verified.

In accordance with the invention a metadatum which is furnished in relation to an image region and which as described is associated in the course of a subsequent data processing operation with a predetermined or postdetermined image portion respectively can be a scale value, wherein a data set is calculated from the inputs of all metadata in relation to the respective image portions, which data set associates a value of a statistical characteristic parameter with an image portion. In that respect that scale value can be a non-metric, that is to say a nominal, a binary or an ordinal but also a metric value such as an interval-scaled or a relationship-scaled value. In accordance with the invention the specified statistical characteristic parameter is also to be interpreted quite generally and can be for example a mean value, a frequency value or also a percentage etc. The specified data set includes at least the respective image portion with associated value of the respective statistical parameter.

It may be desirable if the metadatum specified by the user in relation to the selected image region is selected from two possible scale values (for example pleasant, unpleasant; cold, hot; positive, negative; attractive, unattractive; and so forth) and in relation to each image portion, for both possible scale values, a value of a respective characteristic parameter is calculated having regard to the inputs of survey persons, in particular all such persons. That characteristic parameter can be for example a parameter which can be the frequency of a given scale value over the survey persons or also an averaged scale value.

It may be desirable if the values of the characteristic parameter are color-coded and a topology of the image is calculated, in which the values of the characteristic parameter are color-coded at each image portion. Such data processing permits an image representation in which said characteristic parameter can be specified in color-coded form in the image itself so that the value of the characteristic parameter ascertained for the respective image portions can be represented in a representation, even if falsified in respect of color, of the image.

To expand the information content of the survey it can also be provided in accordance with the invention that metadata in the form of comments can be inputted by the survey persons in relation to the freely selectable image regions, which comments are then recorded in accordance with the method of the invention and taken into account in subsequent processing.

After a characteristic parameter for the inputs of the survey persons is ascertained for each predetermined or postdetermined image portion, it may be desirable if a size scaling is ascertained for each image portion, such scaling depending on the respective value of the characteristic parameter, for example the respective selection frequency of the image portion. That makes it possible to provide a representation of the result of the survey, in which the size representation of the image portion depends on the associated size scaling.

In order to provide that the result of the survey leaves its mark on the evaluation thereof, it can also be provided in accordance with the invention that at least one postdetermined, interrelated image portion is defined, which is embraced with a greater than a predetermined probability by selected image regions. That measure permits automatic adaptation of the evaluation to the inputs of the survey persons which can specify as described one or more freely selectable image regions in the overall image. In an alternative configuration it can also be provided that the postdetermined image portion is selected manually. Establishing such a postdetermined image portion and the evaluation in that respect of the inputted metadata is referred to hereinafter as 'postcode' evaluation while evaluation with predetermined image portions is referred to as 'precode' evaluation.

In relation to a selected image portion it is desirably possible to input not just a single metadatum but also a plurality of metadata, wherein each metadatum can be respectively inputted in the form of a scale value. In that respect this development permits improved information expression in relation to a selected image region, for example, in relation to an image region, it would be possible to process a first metadatum for a scale with the scale values negative and positive, a second metadatum for the scale with the scale values attractive and unattractive, and then, as described hereinbefore, in relation to the predetermined or postdetermined image portions respectively.

It is particularly desirable if the information ascertained by way of the evaluation in relation to the image is represented in the form of a table which for example specifies for predetermined image portions associated metadata, their absolute and relative frequencies and/or relationships.

It may be desirable if that table, for postdetermined image portions, also specifies associated metadata for example in the form of scale values, their absolute and relative frequencies, and/or relationships.

It may be desirable if person-related parameters are stored for a survey person, in particular for all such persons, in which respect a filter function is provided for establishing predetermined parameters associated with the respective survey persons. That makes it possible for the inputs of predetermined survey persons to be selectable for a predetermined assessment of the surveyed metadata in relation to the image. The inputs of other survey persons are then ignored for the respective assessment.

In the apparatus aspect the foregoing object is attained by the invention by an apparatus for ascertaining and providing items of information in relation to an image in a survey comprising means for recording metadata in relation to the image, which are inputted by a large number of survey persons and a data processing device for carrying out an in particular statistical assessment of the recorded metadata in relation to the image. The apparatus according to the invention is distinguished in that data for establishing predetermined and/or postdetermined portions of the image are stored in a storage means, wherein a recorded metadatum is associated with a region of the image that can be freely selected by a survey person and wherein the data processing device is adapted to compare the freely selected image region with the predetermined and/or postdetermined portions of the image and for finding the predetermined and/or postdetermined image portion which has at least a predetermined degree of conformity with the freely selected image region.

In addition desirably the data processing device can be adapted to associate the metadatum recorded for a freely selected image region with the conforming predetermined or postdetermined image portion. In that case the data processing device can carry out the statistical assessment of recorded metadata in relation to the image in relation to the metadata associated with the predetermined and/or postdetermined image portions and store assessment data in a database.

The apparatus according to the invention can desirably comprise a plurality of clients associated with a respective survey person by way of a computer network, which are connected to a server which is connected to a database and the data processing device. In particular the server can include the database and the data processing device. Such a design configuration for the apparatus provides that the survey persons, by way of their respective client, can communicate the metadata to the server, in which then assessment is subsequently effected.

In that respect it may also be desirable if at least one further client is connected by way of the computer network to the server, to which assessment data in respect of the assessment operation about the recorded metadata in relation to the image can be communicated.

It is particularly desirable if assessment parameters such as filter parameters or data for establishing predetermined and/or postdetermined image portions can be communicated by that client to the server so that the evaluation operation can be controlled by that client. For example by way of the input of the filter parameters which are associated with the survey persons use can be made thereof to include or exclude certain survey persons in the assessment or from the assessment.

Figure 2:
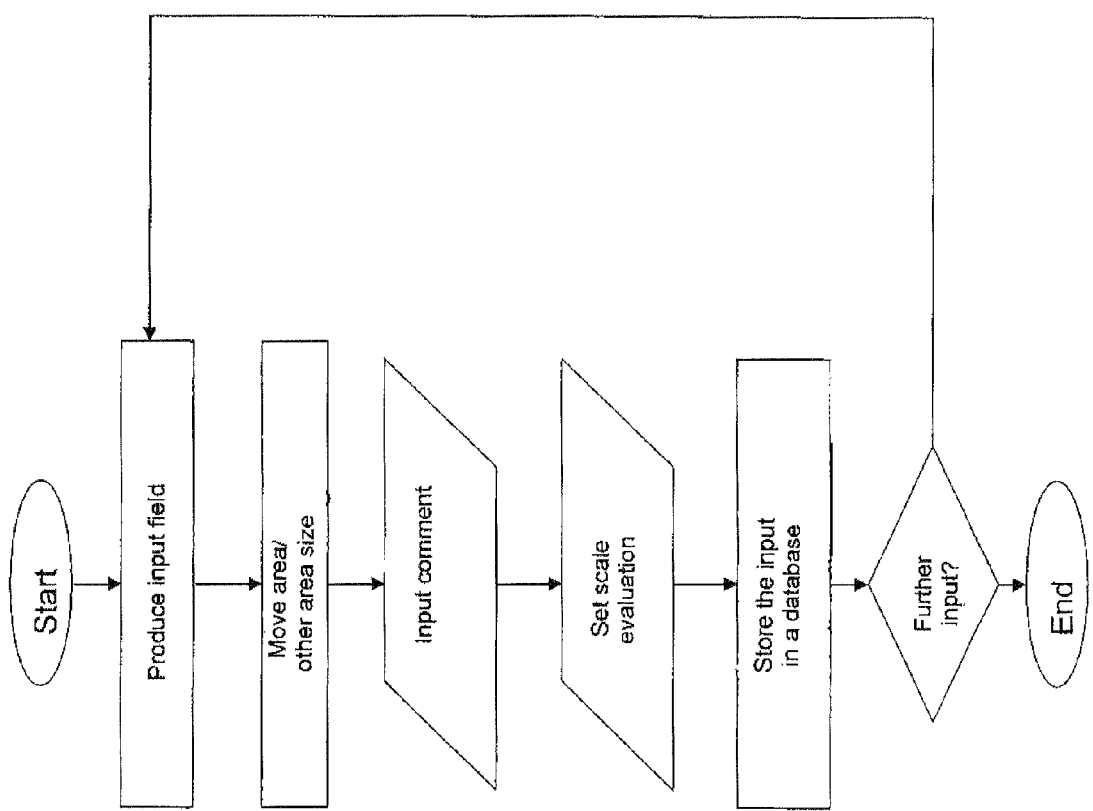
Figure 3:
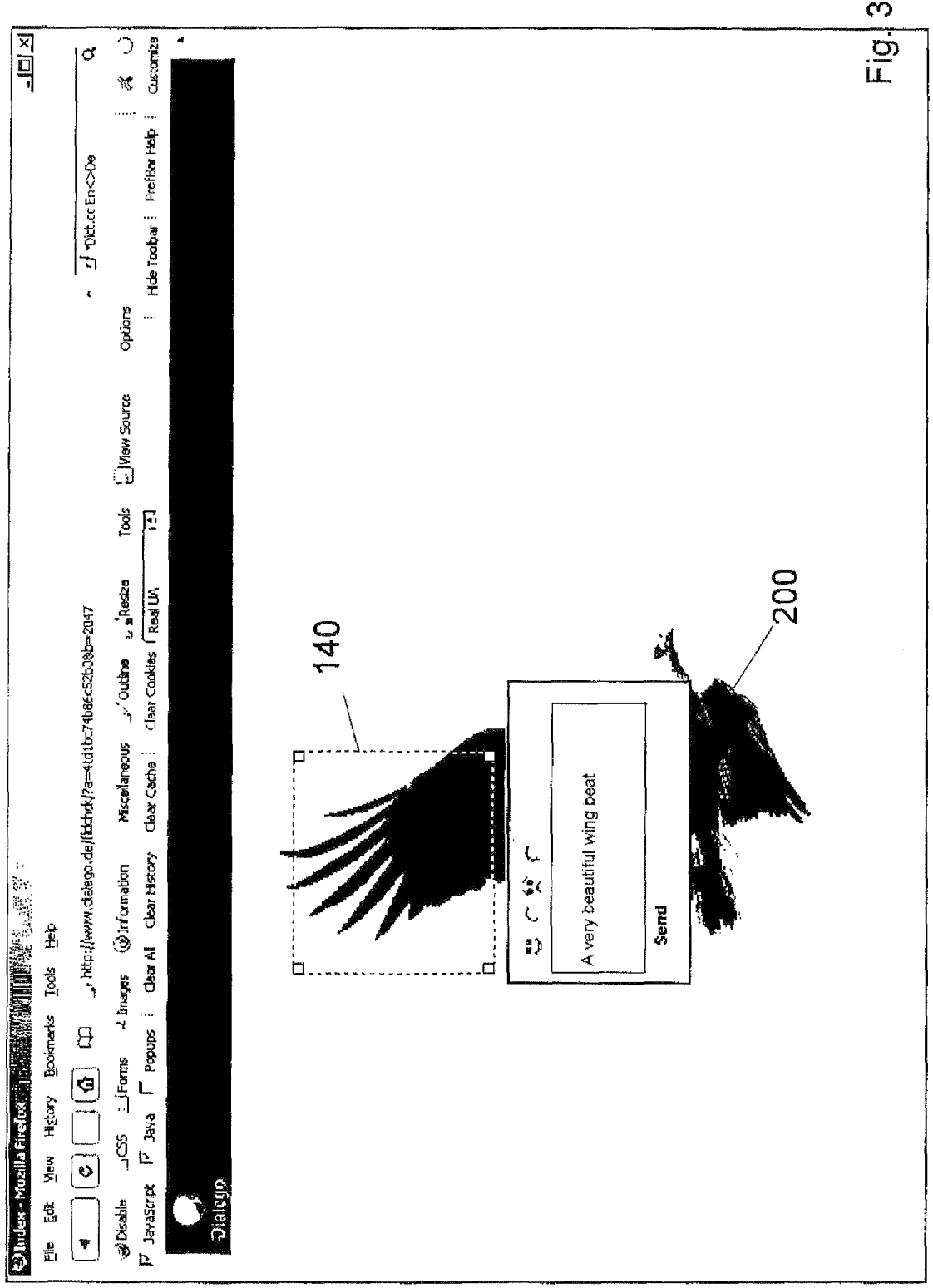
Figure 4:
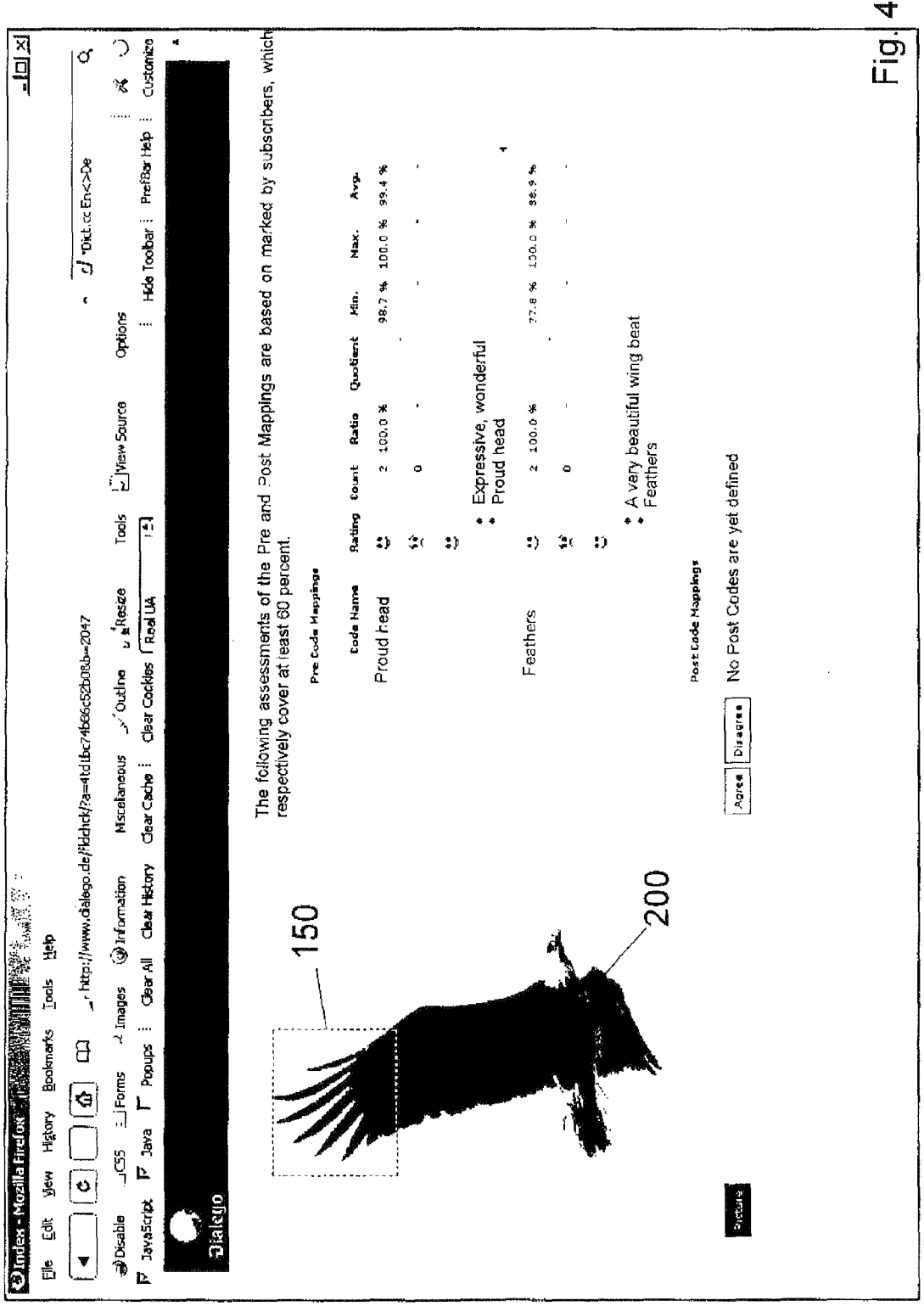
Figure 5:
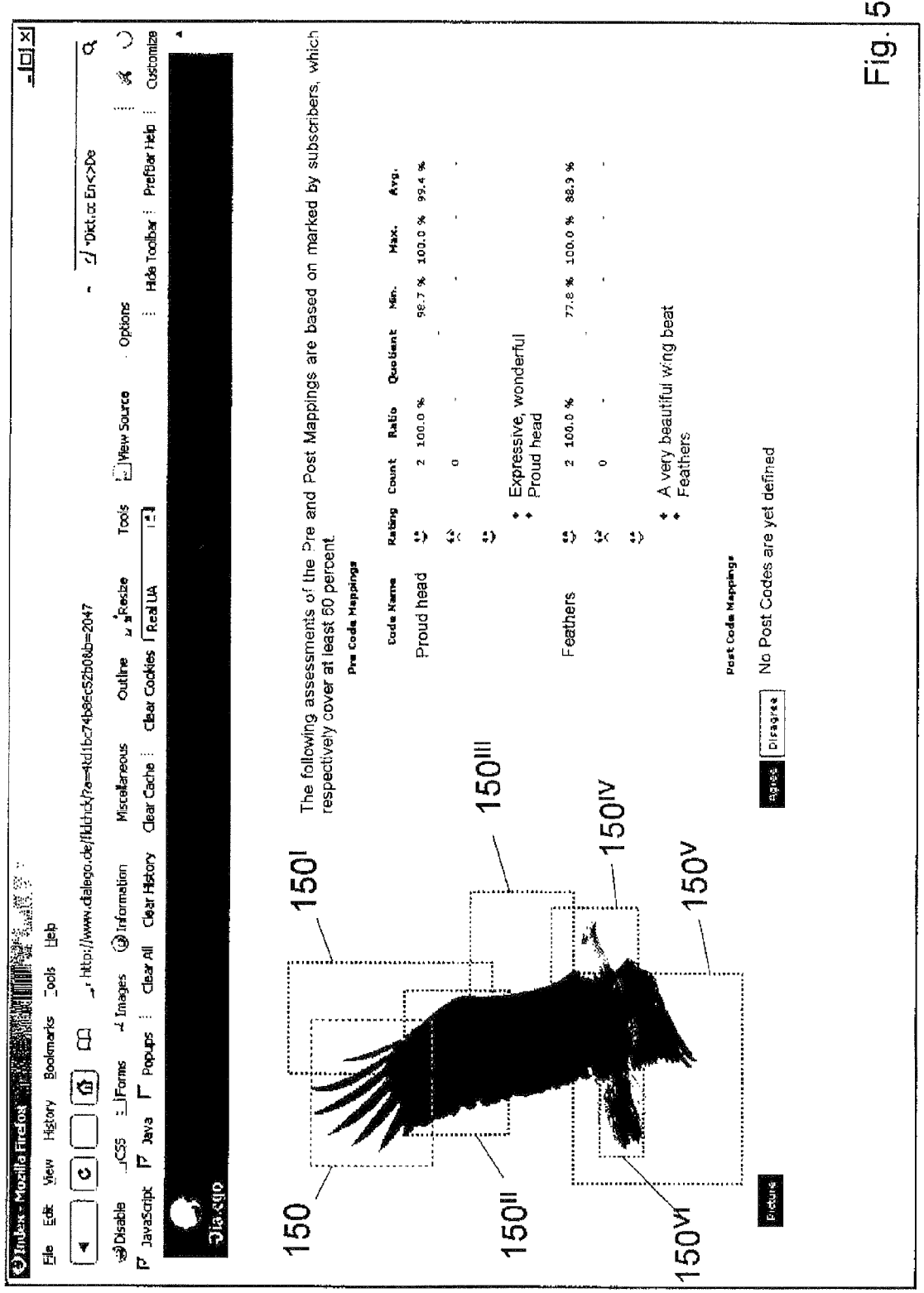
Figure 6:
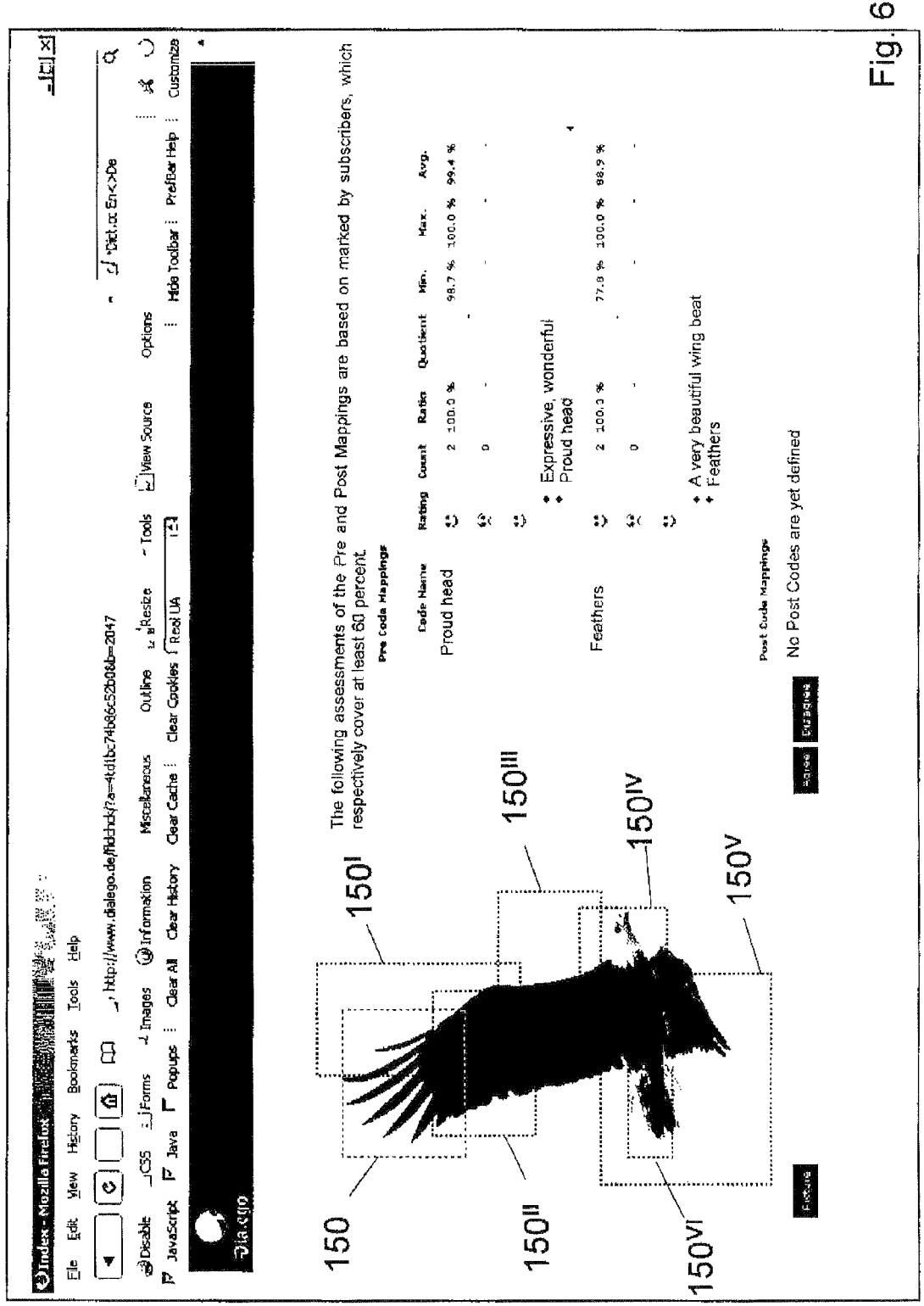
Figure 7:
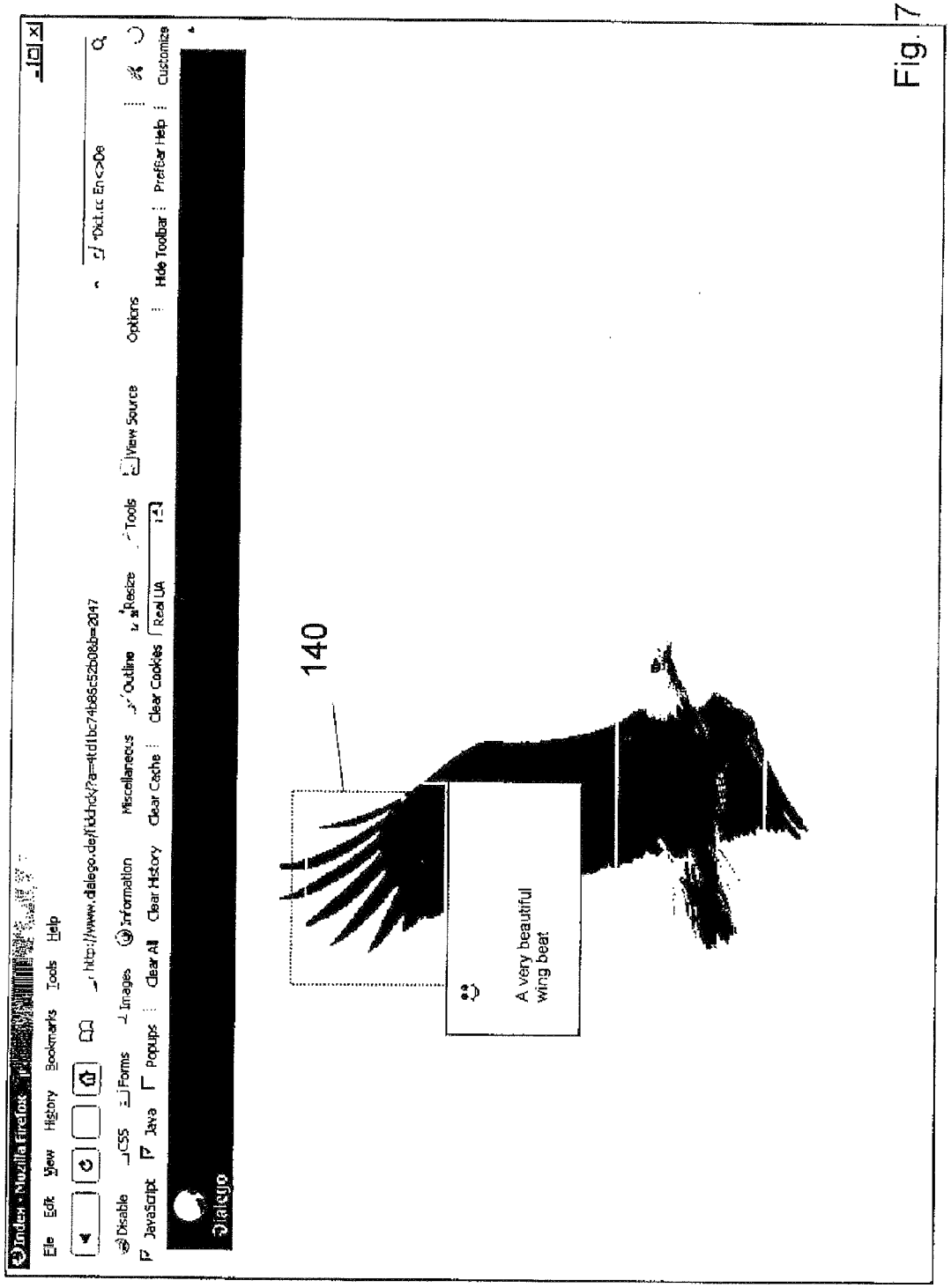
Figure 8:
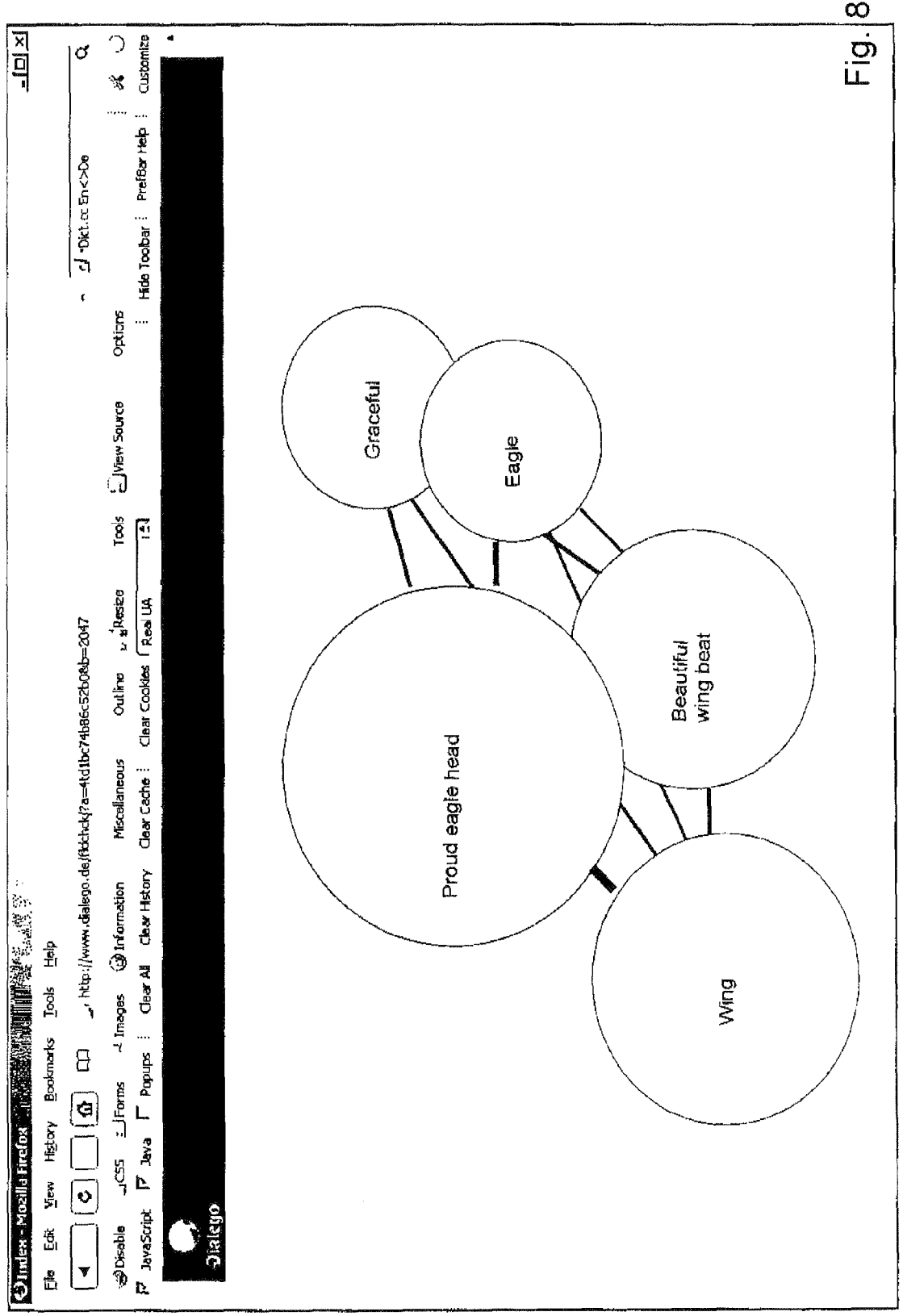
Figure 9:
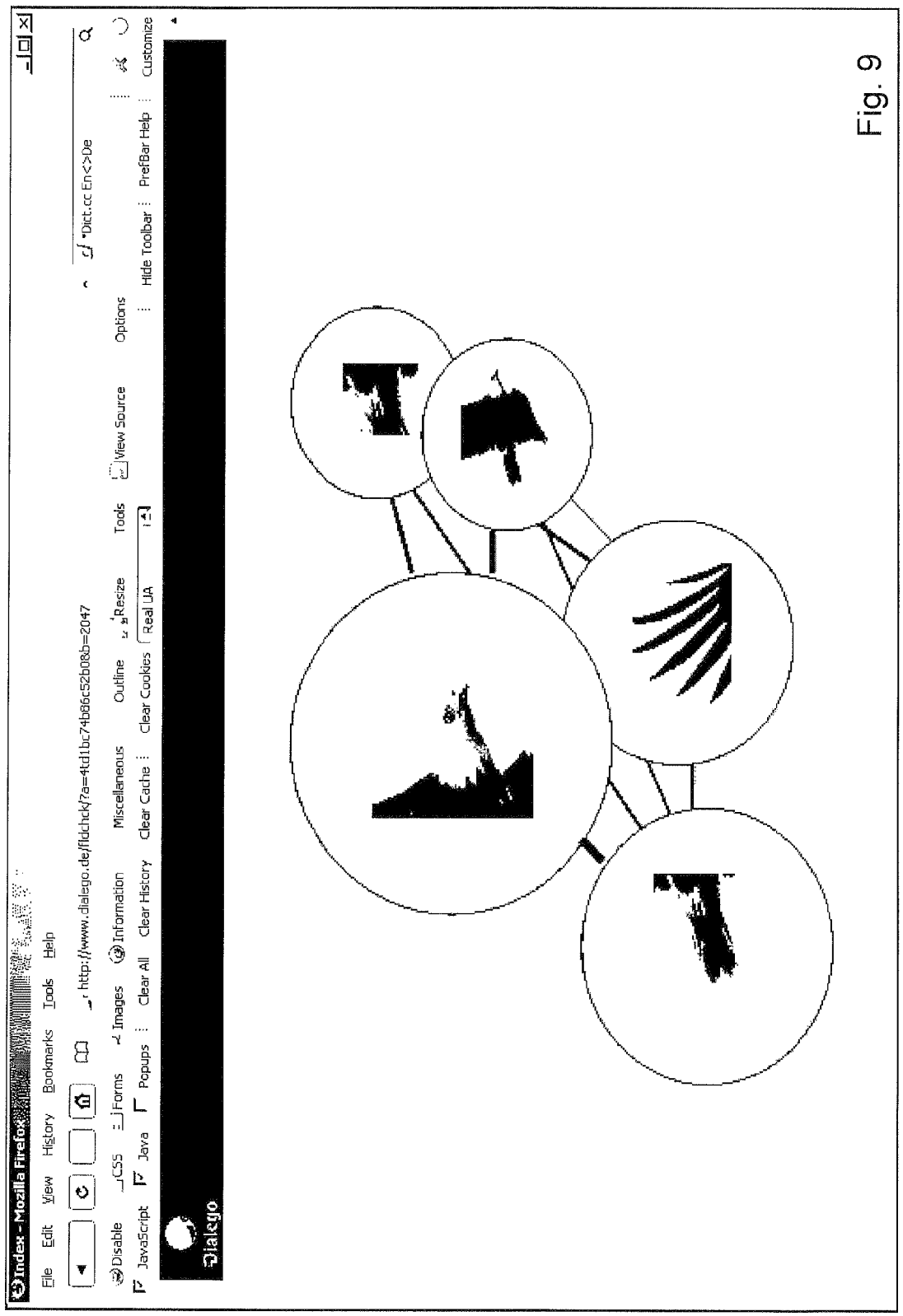

The invention is described hereinafter by the description of an embodiment with reference to the accompanying drawings in which:

FIG. 1 shows a client-server environment for carrying out a method according to the invention by way of example of ascertaining and providing items of information in relation to an image by means of a survey, FIG. 2 shows a flow chart for the input of metadata in relation to an image, FIG. 3 shows an example of such an input, FIG. 4 shows a representation of the surveyed and processed items of information in relation to a predetermined image portion, FIG. 5 shows a representation of the surveyed and processed items of information specifying predetermined image portions which were negatively assessed by the survey persons, FIG. 6 shows a representation of the surveyed and processed items of information specifying predetermined image portions which were positively assessed by the survey persons, FIG. 7 shows a representation of the retrieval of the input of metadata by a given survey person, the input corresponding to that shown in FIG. 3, FIG. 8 shows a representation of the recorded items of information in relation to an image, in which the predetermined image portions are represented as a circle, the respective circle diameter being shown proportionally to the nominal frequency, and FIG. 9 shows a representation corresponding to that of FIG. 8, wherein the respective identification of the predetermined image portion is represented by the image portion itself.

FIG. 1 shows a client-server environment for ascertaining and providing items of information in relation to an image by means of a survey. Provided at the input side are a plurality of clients 10, 20, 30 which are respectively associated with a survey person and by way of which the respective survey person can input the metadata in relation to an image. The clients which, depending on the survey or poll involved, can include a number of several thousands are connected by way of a computer network, for example the Internet 40, to the apparatus 100 according to the invention for ascertaining and providing items of information in relation to an image by means of a survey. In addition that apparatus 100 can in turn be data-connected by way of the Internet 40 to a client 50 by way of which data and results about the survey or poll can be retrieved. The apparatus 100 substantially includes a webserver 110 for recording the inputs of the clients 10 through 50 and a data processing device 135 for processing and assessing the recorded metadata in relation to the image. There is also provided a database 120 in which in particular survey and assessment data are stored, in addition predetermined data such as predetermined image portions and data about the survey persons.

The data inputted by the survey persons are recorded, that is to say acquired, by the apparatus 100, they are indicated by reference 130a-c in the illustrated view. In that respect 130a identifies the inputted login data, 130b the selected image regions as well as the metadata inputted in that respect by each respective survey person. Stored in the database 120 are in particular data of the statistical assessment procedures about the survey 120a, data about the survey persons 120c and data about predetermined image portions 120b. All inputs of each survey person are also stored in the database. In addition, after the beginning of the survey and during the assessment procedure, in dependence on the survey data which have been inputted hitherto, data about so-called post-determined image portions can be defined, which are identified by reference 120d in FIG. 1.

After a user has logged in in the survey apparatus 100 by inputting his respective login data, the image in relation to which the survey is being conducted is displayed to that user. The procedure involved in the subsequent input on the part of the respective survey person is shown in FIG. 2 in the form of a flow chart. The real situation on the display screen of the survey person is shown in FIG. 3.

In the present case metadata in relation to the image representation 200 of an eagle are to be inputted by the survey persons. After the automatic production of an input field, see FIG. 2, the survey person can mark any region of the image, whereby two input fields are automatically produced, an input field for the input of a comment, here 'a very beautiful wing beat', and a further input field in which the survey person assesses the selected image region 140 by way of the input of a scale value which can be selected from a predetermined number of scale values. In the example shown in FIG. 3 the user has to select from two possible scale values which are represented by two smilies and stand for approval or rejection.

In an embodiment which is not shown the evaluation scale includes more than two, for example five or ten values, from which the survey person can then again select. It is however also possible in further embodiments for the survey person to input a scale value numerically, which is within a predetermined range. Hereinafter the input of a scale value is referred to as providing a 'scaled evaluation'.

After both metadata, that is to say the comment and also the scaled evaluation for the freely selected image region have been produced the inputs of the survey persons are automatically stored by way of the webserver 110 in the database 120.

The survey person can thereupon select further regions of the image and here too input the described metadata.

The inputs in that respect of all survey persons are collected in the recording apparatus 100 and processed in the data processing device 135. In that respect, for each survey person, firstly the freely selected image region 140 is compared to the predetermined image portions stored in the database before the beginning of the survey. If, in the predetermined image portions 150 which are identified in FIGS. 4 through 6 as 'Pre Code Mappings', a conformity is found with the image region freely selected by the respective survey person, then the metadata inputted by the respective user in relation to the selected image region 140 are associated with the conforming preselected image portion 150 in the processing unit 135 and form the basis for further assessment, in particular a statistical assessment of the metadata. In the described example, conformity of the freely selected image region with a predetermined image portion will occur when the selected image region conforms with at least 60% of the area of the predetermined image portion.

It will be appreciated that, in other embodiments, it is also possible to set a differing degree of conformity.

The described method provides that each survey person can select the regions in the presented image, in a completely uninfluenced fashion, and in that respect can input metadata like scaled values or comments. The transfer of those inputs for freely selected image regions to predetermined image portions for the inputs of all survey persons means that it is possible to generate a databank for subsequent statistical assessment in which, at least in one embodiment, the inputted metadata are associated with the ascertained conforming image portions.

In the situation shown in FIG. 3 the survey person in question still has to implement the metadatum for the scaled input by a mouse click in one of the two free fields and can then conclude the input.

FIG. 4 shows the result of an assessment of the survey as can be displayed for example at the client 50. Once again the left-hand side shows the image 200 in relation to which the survey is carried out while the right-hand side shows survey assessment data in tabular form.

Specified in the first column are two predetermined image portions which are identified by 'proud head' and 'feathers' respectively. In the image of the eagle the second predetermined image portion 150 'feathers' is identified. As a comparison with FIG. 3 shows, that predetermined image portion 150 is different from the image region 140 selected by the survey person. By virtue of the conformity >60% in terms of area the metadata inputted by the survey person in FIG. 3 were associated with the predetermined image portion 150 'feathers', that is to say in the tabular assessment representation they appear under the specified predetermined image portion. As can be seen from FIG. 4 the predetermined image portion was associated twice with inputs from survey persons, in which respect on one occasion there was a 100% conformity in surface area and in the input from the second survey person there was a conformity of 77.8% so that this gives an average conformity of 88.9%. As can be seen from the Table both survey persons have specified the wing portion in their scaled input as positive. In the last two lines which are associated with the image portion 150 'feathers' the comments inputted by the two survey persons are specified as 'a very beautiful wing beat' and 'feathers' respectively. Similar data are ascertained and represented for the second predetermined image portion 'proud head'.

In FIGS. 5 and 6 the predetermined image portions 150, $150^i$, $150^{ii}$, $150^{iii}$, $150^{iv}$, $150^v$, $150^{vi}$ are specified in broken line, which were evaluated by the multiplicity of survey persons in the scaled evaluation (in the example two possible scale values) as positive (FIG. 5) and negative (FIG. 6) respectively.

The respective inputs of individual survey persons can also be retrieved at the client 50. Such a situation is shown in FIG. 7 which corresponds to the input situation shown in FIG. 3.

The described embodiment provides that, during or after the survey, that is to say after recording of the metadata inputted by the survey persons in relation to image regions, postdetermined image portions are established for the assessment operation. Those postdetermined image portions then replace the above-described predetermined image portions in the assessment procedure so that then the image regions freely selected by the respective survey persons are compared to the postdetermined image portion or portions and, if conformity applies, the metadata inputted in relation to a selected image region are associated with the conforming postdetermined image portion.

In accordance with the invention still further modes of representation of the surveyed or selected items of information as can be represented by way of example at the client 50 can also be advantageous. Corresponding examples are shown in FIGS. 8 and 9. In FIG. 8, all comments which were added for predetermined image portions are specified in the form of a key word or 'tag', in a respective circle, the diameter of the respective circle corresponding to the addition frequency of the tag over all survey persons.

FIG. 9 shows the same representation, with the difference that the respective image portions themselves are shown in the associated circles.

A representation which is not shown here provides that, in the case of a scaled evaluation input, for each predetermined or postdetermined image portion, a value for a characteristic parameter, for example an averaged scale value, is to be calculated from the inputted scale values, and the values of the characteristic parameter are to be specified in color-coded fashion within the image. If for example in the input there is the choice between two possible scale values such as positive/negative, then a value of a characteristic parameter and the value of a relative frequency can be calculated for one or both scale values, in which case a frequency value of that kind is ascertained for each predetermined or postdetermined image portion. The assessment result can be represented for example directly in the image if the frequency values of the image portions are represented in color-coded fashion.

In addition there is also the possibility of specifying filter parameters for the assessment operation by way of the client 50 in order for example to select the input data of given survey persons so that the assessment can be carried out in correspondingly differentiated fashion.

LIST OF REFERENCES 10 client
20 client
30 client
40 Internet
50 client
100 recording apparatus
110 webserver
120 database
120a statistical assessment data
120b data for predetermined image portions
120c data relating to information in respect of persons
120d data relating to postdetermined image portions
130a login data
130b data relating to selected image regions
130c metadata
135 data processing device
140 selected image region
150, $150^i$, $150^{ii}$, $150^{iii}$, $150^{iv}$, $150^v$, $150^{vi}$ predetermined image portion
200 image

What is claimed is:

1. A method of ascertaining and providing information in relation to an image in a survey comprising:
   displaying the image to a large number of survey persons;
   recording the input of metadata in relation to the image which are inputted by the large number of survey persons by recording input of at least one metadatum carried out by each one of the survey persons in relation to a region of the image that has been freely selected by at least one of the survey persons; and
   carrying out an assessment of the recorded metadata in relation to the image;

wherein the image is subdivided into at least one of a plurality of predetermined image portions, which are defined prior to beginning of the survey, or into a plurality of postdetermined image portions, which are defined after the conclusion of the survey, wherein the input of all of the survey persons in relation to associated image regions that have been freely selected by each of the survey persons are transferred to the predetermined or postdetermined image portions, wherein each freely selected image region is compared to the predetermined or postdetermined image portions in relation to a conformity in respect of area, and, upon the occurrence of a conformity between the respective freely selected image region and the pre- and/or postdetermined image portions beyond a predetermined degree, the metadatum recorded in relation to the respective freely selected image region is associated with the conforming, predetermined or postdetermined image portion, and wherein the assessment of the recorded metadata in relation to the image is carried out in relation to the metadata associated with the predetermined and/or postdetermined image portions.

2. A method as set forth in claim 1, wherein the items of information ascertained by the assessment in relation to the image are represented visually.

3. A method as set forth in claim 1, wherein the metadatum which is associated with an image portion is a scale value, wherein a data set is calculated from the inputs of all metadata in relation to the respective image portions, which data set associates a value of a statistical characteristic parameter with an image portion.

4. A method as set forth in claim 3, wherein metadatum is selected from two possible scale values and a value of a respective characteristic parameter is calculated in relation to each image portion for both possible scale values.

5. A method as set forth in claim 4, wherein the values of the characteristic parameter are color-coded and a topology of the image is calculated, in which the values of the characteristic parameter are color-coded at each image portion.

6. A method as set forth in claim 1, wherein metadata in the form of comments are recorded in relation to the freely selectable image regions.

7. A method as set forth in claim 1, wherein a data set is calculated, which associates with each predetermined or postdetermined image portion a size scaling which depends on the respective selection frequency of the image portion.

8. A method as set forth in claim 1, wherein at least one postdetermined, continuous image portion is defined and embraced by selected image regions with a greater probability than a predetermined probability.

9. A method as set forth in claim 1, wherein a plurality of metadata each in the form of a scale value are associated with a selected or predetermined or postdetermined image portion.

10. A method as set forth in claim 2, wherein a table is provided for the representation of the ascertained items of information, which table specifies for predetermined image portions associated metadata, their absolute and relative frequencies and/or relationships.

11. A method as set forth in claim 10, wherein the table for postdetermined image portions specifies associated metadata in the form of scale values, their absolute and relative frequencies and/or relationships.

12. A method as set forth in claim 1, wherein person-related parameters are stored for a survey person.

13. A method as set forth in claim 12, wherein a filter function is provided for establishing predetermined parameters associated with the respective survey persons, and the survey persons whose inputs are evaluated for the representation are determined.

14. Apparatus for ascertaining and providing information in relation to an image in a survey comprising:
 means for recording input of metadata in relation to the image, the metadata being inputted by a large number of survey persons by recording input of at least one metadatum carried out by each one of the survey persons in relation to a region of the image that has been freely selected by at least one of the survey persons; and
 a data processing device for carrying out an assessment of the detected metadata in relation to the image;
 wherein data for establishing predetermined portions of the image are stored in a storage means prior to beginning of the survey and/or data for establishing postdetermined portions of the image are stored in a storage means after conclusion of the survey, wherein the input of all of the survey persons in relation to associated image regions that have been freely selected by each of the survey persons are transferred to the predetermined or postdetermined image portions, wherein the data processing device is configured to compare each freely selected image region with the predetermined and/or postdetermined portions in relation to a conformity in respect of area of the image and to find the predetermined and/or postdetermined image portion which has at least a predetermined degree of conformity with the respective freely selected image region and to determine said found predetermined and/or postdetermined image portion as a conforming predetermined and/or postdetermined image portion,
 wherein the data processing device is configured to associate the metadatum recorded in relation to the respective freely selected image region with the conforming predetermined or postdetermined image portion, and
 wherein the data processing device carries out statistical assessment of the recorded metadata in relation to the image in relation to the metadata associated with the predetermined and/or postdetermined image portions and stores assessment data in a database.

15. Apparatus as set forth in claim 14, wherein a plurality of clients respectively associated with a survey person are connected by way of a computer network to a server which is connected to the database and the data processing device.

16. Apparatus as set forth in claim 14, wherein at least one client is connected by way of a computer network to the server, to which assessment data of the statistical assessment about the recorded metadata in relation to the image can be communicated.

17. Apparatus as set forth in claim 16, wherein assessment parameters including filter parameters or data for establishing predetermined and/or postdetermined image portions are communicated to the server by the client receiving assessment data.

* * * * *

UNITED STATES PATENT AND TRADEMARK OFFICE
CERTIFICATE OF CORRECTION

| | | |
|---|---|---|
| PATENT NO. | : 8,677,258 B2 | Page 1 of 1 |
| APPLICATION NO. | : 12/106259 | |
| DATED | : March 18, 2014 | |
| INVENTOR(S) | : Andera Gadeib | |

It is certified that error appears in the above-identified patent and that said Letters Patent is hereby corrected as shown below:

In the Claims:

In column 9, line 31, in Claim 4, before "metadatum" insert -- the --.

Signed and Sealed this
First Day of July, 2014

Michelle K. Lee
*Deputy Director of the United States Patent and Trademark Office*